United States Patent [19]

Loreck

[11] 4,045,771
[45] Aug. 30, 1977

[54] ENCODING AND DECODING DEVICE FOR ERROR-DETECTING TRANSMISSION SYSTEMS, IN PARTICULAR FOR REMOTE-CONTROL AND REMOTE-ACTUATION EQUIPMENTS

[75] Inventor: Heinz Loreck, Kronberg, Taunus, Germany

[73] Assignee: Helmut Leinfellner, Austria

[21] Appl. No.: 651,254

[22] Filed: Jan. 22, 1976

[30] Foreign Application Priority Data

Jan. 22, 1975 Austria .................................. 451/75

[51] Int. Cl.² .................... G06F 11/00; G08C 25/00
[52] U.S. Cl. ........................................ 340/146.1 BA
[58] Field of Search ............................ 340/146.1 BA; 235/153 AH

[56] References Cited

U.S. PATENT DOCUMENTS

| | | | |
|---|---|---|---|
| 2,512,038 | 6/1950 | Potts | 340/146.1 BA |
| 3,340,506 | 9/1967 | Mayer | 340/146.1 BA |
| 3,351,919 | 11/1967 | Milford | 340/146.1 BA |
| 3,419,804 | 12/1968 | Gorog et al. | 340/146.1 BA |
| 3,523,279 | 8/1970 | Briley et al. | 340/146.1 BA |
| 3,978,449 | 8/1976 | Sanders et al. | 340/146.1 BA |

Primary Examiner—Charles E. Atkinson
Attorney, Agent, or Firm—McGlew and Tuttle

[57] ABSTRACT

An encoding transmitting unit converts parallel data words into timing pulse synchronized serial data words which are supplied to a transmission channel, and a decoding receiving unit receives the transmitted serial data words from the transmission channel. The encoding unit comprises a clock-pulse generator and a control circuit connected to a shift register receiving the parallel data words and having a feedback, through an inverter, from a serial word output to an additional input which is a serial word input for the inverted output signal. The shift register transmits a first pulse train representing the serial data word followed by a second pulse train representing the inverted serial data word. The decoding receiving unit includes a second shift register having a serial data word input receiving the two pulse trains from the transmission channel and having a serial data word output. An inverting exclusive OR gate has one input connected to the serial word output of this register and another input receiving the transmitted pulse trains from the transmission channel. This OR gate monitors the non-equivalence of the first and second pulse trains, to detect transmission errors and transfer the errors, as error signals, to a flip-flop acting as an error signal storage. A receiving register is connected to the shift register of the receiving unit and is operable to evaluate the transmitted data. The error signal storage, upon receipt of an error signal, prevents such evaluation of the transmitted data in the receiving register. The system may be simplified by using a pulse position modulation and may also be used for a pulse duration modulated signal. In the latter case, a synchronization bit is transmitted before each data word. An outstanding feature of the system is that it may be used with a single simple transmission channel.

14 Claims, 9 Drawing Figures

ENCODING AND DECODING DEVICE FOR ERROR-DETECTING TRANSMISSION SYSTEMS, IN PARTICULAR FOR REMOTE-CONTROL AND REMOTE-ACTUATION EQUIPMENTS

FIELD AND BACKGROUND OF THE INVENTION

The present invention relates to an encoding and decoding device for error-detecting data transmission systems, in particular for remote-control and remote-actuation equipments.

Known error-detecting methods operate, for example, with fixed particles of the data words, to make the detection of an error possible. With such a system, errors are detected to a large extent. However, the detection cannot be considered satisfactory in all cases since, with an invalidation at the same time of two bits of a given data word, the right parity is restored even though the data word has been invalidated. Particularly in radio transmission devices, such a disturbance cannot be eliminated.

In other known methods, every data word is transmitted two times in sequence and the first word is stored separately, in parallel, and compared with the subsequent word. Differences are evaluated as errors. Known circuits have the disadvantage that periodic disturbances may invalidate the two values in the same manner so that no error can be detected. Further, the parallel-connection technique used in these circuits does not appear as an optimum solution for the MOS technique and integrated circuits.

According to other methods known in the wire transmission of information, the data are transmitted in parallel over two lines, with one line transmitting the positive-going data values and the other line transmitting the inverted values. A coincidence of the two transmissions is the error criterion. This method is tied to two parallel transmission paths and, therefore, frequently unusable.

SUMMARY OF THE INVENTION

The present invention is directed to a transmission system for conveying information by means of pulse trains of predetermined length, for operation on single simple transmission lines or channels, making it possible to securely detect errors and, in addition, being best suitable for the use of a dynamic MOS technique, and the use of integrated circuits.

In accordance with the invention, two shift registers, one in the transmitter and one in the receiver, are provided and are synchronized by timing pulses and serve as temporary-storage devices. The shift register provided in the transmitter comprises an additional serial input to which the serial output supplied to the transmission channel is fed back through an inverting element, for producing a second, nonequivalent, pulse train known per se. In the receiver, the input line supplied from the transmission channel is connected, respectively, to the serial input of the shift register and, through a connection bypassing the shift register, to one input of a comparator which is designed as an exclusive OR circuit having its second input connected to the serial output of the shift register. The occurring transmission errors are detected by this comparator and transferred, as error signals, into an error signal storage, which is provided for this purpose and, upon occurrence of a transmission error, prevents the evaluation of the transmitted data in the receiving register.

This method offers the largest possible security against incorrectly transmitted data words. In addition, this serial circuitry offers the advantage of very low constructional cost and is best suited for being applied to integrated circuits in a dynamic MOS technique. The circuitry may be simplified by using a pulse modulation where the information is contained in the pulse timing. For example, a pulse duration modulation may be used since, in such case, the costs of the timing pulse regeneration are minimized. In such a case, the data recurrence frequency remains constant since any change in the word length appears as an opposite change in the inverted word. A further simplification of the circuitry, while using the pulse duration modulation, results from the possibility of providing a synchronizing bit in advance of each data word, in order to be able, upon a disturbance, to synchronize the evaluation instantly with the following word. A particularly favorable utilization of the transmission capacity can be obtained, in the case of a pulse duration modulation, if the pulse spaces are also modulated in length. Thereby, a triple transmission capacity is obtained for each data block, comprising the combination (W pulse + $\overline{W}$ pulse) + (W space), without affecting the error detection. If, for example, a W pulse comprises a 4-bit word, the resulting transmission capacity is W pulse (4 bits) + W space (8 bits) = 12 bits.

An object of the invention is to provide a transmission system for conveying information by means of pulse trains of predetermined length and which is suitable for operation on single simple transmission lines or channels.

Another object of the invention is to provide such a transmission system capable of securely detecting errors in transmission.

A further object of the invention is to provide such a transmission system which is the best suitable for the use of a dynamic MOS technique and the use of integrated circuits.

For an understanding of the principles of the invention, reference is made to the following description of typical embodiments thereof as illustrated in the accompanying drawings.

DESCRIPTION OF THE PREFERRED EMBODIMENTS

Figure 1:
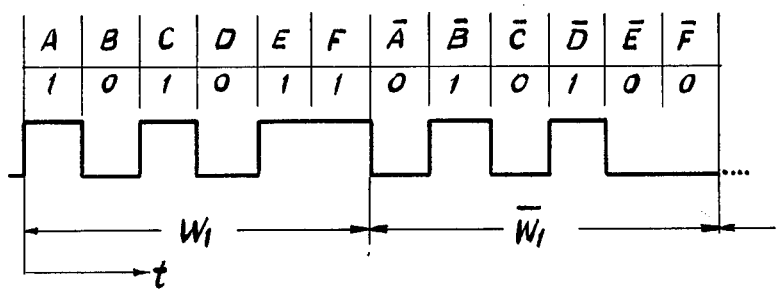
FIG. 1 is a pulse diagram of a timing-pulse synchronized transmission signal.
Figure 2:
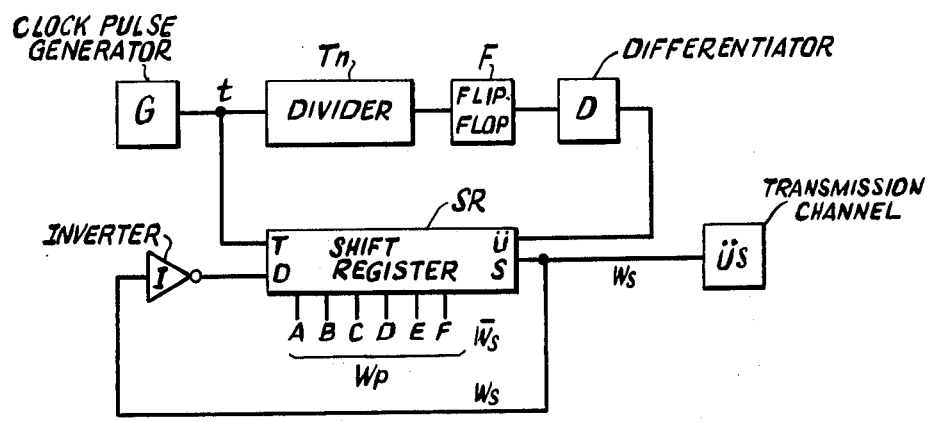
FIG. 2 is a block diagram of an embodiment of an encoding transmitter for synchronized data.

In FIG. 1, the pulse diagram of a data word comprising 6 bit locations (A to F) is shown, as an example, The sequential position of the word W and the inverted word $\overline{W}$ is apparent. FIG. 2 shows an encoding unit dynamiciser for converting parallel data words Wp into timing-pulse synchronized serial data words in accordance with the invention, i.e., in the word sequence $W_n - \overline{W}_n - W_{n+1} - \overline{W}_{n+1}$ . . . . The encoding unit comprises a clock-pulse generator G, a control circuit (divider $T_n$, flip-flop F and differentiator D) and a first shift register SR, with a feedback through an inverter I.

After $2n$ clock pulses, where $n$ equals the number of bits per word, the output of flip-flop F assumes the state 1. This 0 to 1 transition is differentiated by differentiator D and delivered to the input Ü for controlling the parallel reception of shift register SR. Shift register SR receives the introduced data word Wp and transfers it, sequentially and in synchronism with the clock, as a serial word $w$, to the transmission channel ÜS. Simultaneously, the inverted serial word is applied to the serial input D so that, after $n$ clock pulses, the register delivers the inverted word Ws, at the serial output S, during the following $n$ clock pulses. After $2n$ clock pulses, another 0 to 1 transition takes place at the output of flip-flop F again, effecting a new reception of a parallel word Wp.

Figure 3:
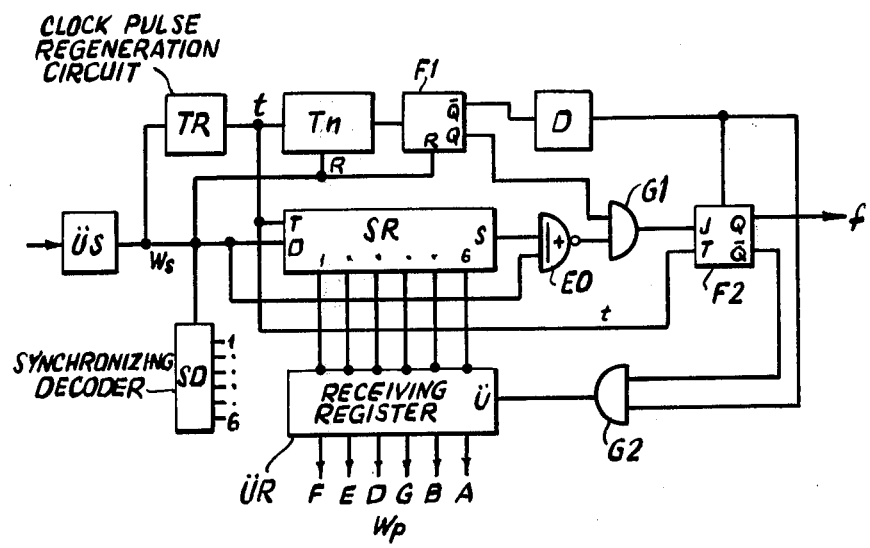
FIG. 3 is a block diagram of an embodiment of a decoding receiver for synchronized data.

FIG. 3 shows an embodiment of a decoding receiving unit for clock-pulse synchronized data in accordance with FIG. 1. The serial data coming from transmission channel ÜS ar directed, respectively, to a clock-pulse regeneration circuit TR (which, for example, is a PLL circuit assumed to be known) and to the serial input D of a second shift register SR. The number of cells of shift register SR is equal to $n$. Serial input D and serial output S of this shift register are connected to respective inputs of an inverting exclusive OR gate EO . By means of this gate EO, the inequivalence of the words $W_s$ and $\overline{W}_s$ is monitored. The output of gate EO is connected, through an AND gate G1, to the dynamic input J of flip-flop F2. The second input of gate G1 is connected to the output Q of a flip-flop F1. In parallel to the reception of the data in second shift register SR, there is provided a divider Tn whose output controls flip-flop F1.

After $n$ clock pulses, thus at the time at which the corresponding words $w$ and $\overline{w}$ start at output S and input D of second shift register SR, output Q of flip-flop F1 assumes the state 1. During the timing period $n$ up to $2n$, output Q of flip-flop F1 remains 1 and, consequently, the passage of signals from gate EO, monitoring the non-equivalence of $w$ and $\overline{w}$, through AND gate G1 to input J of flip-flop F2 is cleared. If now, due to a transmission error, for example, two corresponding bits of words $w$ and $\overline{w}$ become equivalent, the output signal of gate EO becomes 1 and flip-flop F2 is set. The "error signal" $f$ becomes 1, and $\overline{f} = 0$ blocks the reception of data in receiving register UR, through a gate G2. If no error occurs, $f$ remains 1. At the clock time $2n$, output $\overline{Q}$ of flip-flop F1 = 1. This 0 to 1 transition is differentiated by differentiator D. The signal thus produced is delivered, through gate G2, to the reception-control input Ü of receiving register UR which receives the word Wp applied at that time to outputs 1 to 6 of shift register SR and holds it stored as a parallel word at its outputs A to F, up to the reception of the next word. In case the reception of prevented by an error signal $f$, the last word transmitted without disturbance remains stored in receiving register UR. For synchronizing divider Tn and flip-flop F1, a casual transmission of a synchronization value (for example of the trivial O word) is needed. This word appears as a serial word combination $(w = 0) + (\overline{w} = 2^n)$ and is detected by a synchronization decoder SD. In the synchronization decoder, a synchronizing pulse is derived from the 0 to 1 transition between $w$ and $\overline{w}$, which is applied to the reset inputs R of divider Tn and flip-flop F1.

Figure 4:
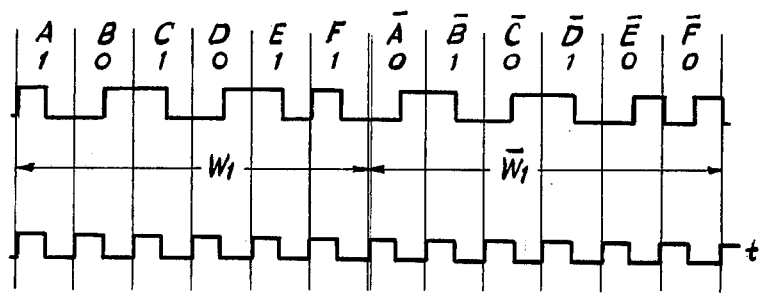
FIG. 4 is a pulse diagram of a pulse position modulated transmission signal.
Figure 5:
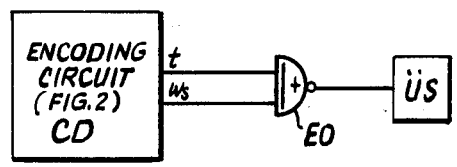
FIG. 5 is a block diagram of an encoding transmitter for pulse position modulated signals.

To simplify the timing-pulse synchronization at the receiving side, a pulse modulation may advantageously be used, comprising the information, in all words, even the most trivial ones 0 and $2^n$, through the data timing. Such a modulation is, for example, pulse position modulation, with two modulation stages $y_1 = 0°$ and $Y_o = 180°$ (FIG. 4). In order to convert clock-synchronized data according to FIG. 1 into a pulse position modulated signal, an inverting exclusive-OR gate EO (FIG. 5) is connected between an encoding circuit according to FIG. 2 and the transmission channel ÜS. As soon as the serial word $w$ and clock pulses $t$ are applied to the inputs of gate EO, the output delivers a pulse position modulated signal in accordance with FIG. 4.

Figure 6:
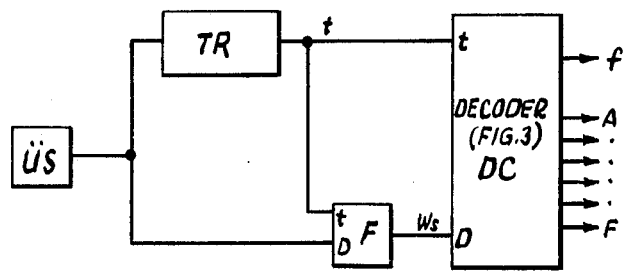
FIG. 6 is a block diagram of a decoding receiver for pulse position modulated signals.

To be able to treat a pulse position modulated signal by means of a decoder DC of FIG. 3, the pulse position modulated signal must be reconverted into a clock-synchronized signal according to FIG. 1, which may be effected, as shown in FIG. 6, by the interconnection of a D-flip-flop F between the transmission channel and decoder DC.

Figure 7:
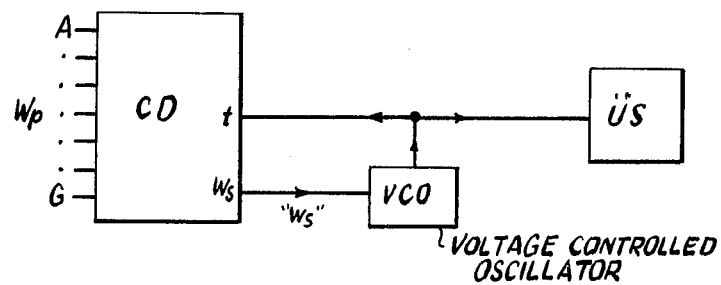
FIG. 7 is a block diagram of an embodiment of an encoding transmitter for pulse duration modulated signals.

FIG. 7 indicates an embodiment of an encoder for a pulse duration modulated signal. In order to obtain a pulse duration modulated signal, the clock-pulse generator G in the encoder of FIG. 2 is replaced by a voltage-controlled oscillator VCO. The output signal of this oscillator is the pulse duration modulated data signal.

Figure 8:
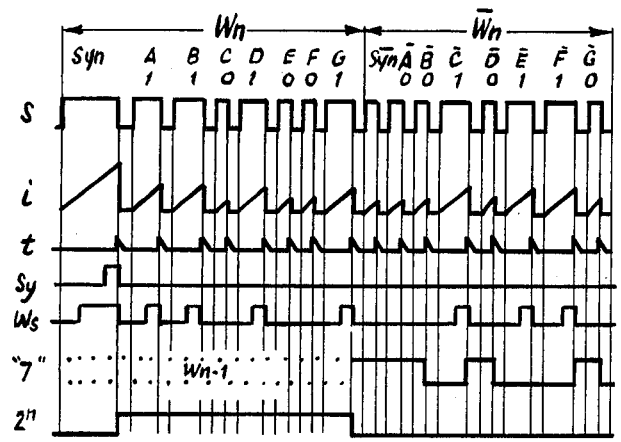
FIG. 8 is a pulse diagram for decoding a pulse duration modulated transmission signal including a synchronizing bit.
Figure 9:
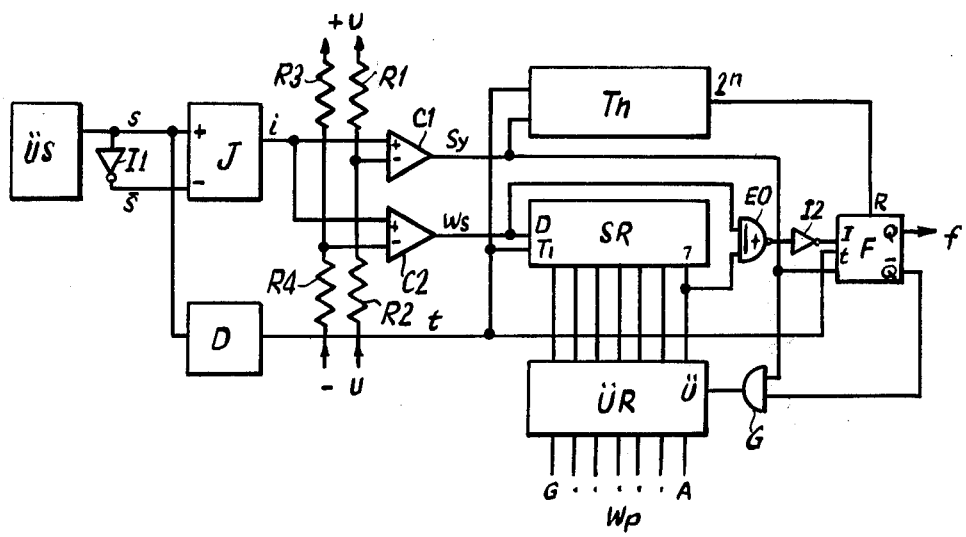
FIG. 9 is a block diagram of an embodiment of a decoding receiver circuitry for pulse duration modulated signals including a synchronizing bit, in accordance with FIG. 8.

The pulse diagram of such a signal, along with a synchronization bit before each data word, is shown in FIG. 8 as the signal "s". The reception of the data at the receiving side and their treatment up to the parallel word Wp will be explained with reference to FIGS. 8 and 9. The signal $s$ coming from transmission channel ÜS is directed to the non-inverting input of an integrator J. It is important that the integration time constant is substantially smaller for the negative edges than for the positive edges. This results in a saw-tooth shaped signal $i$ at the output of integrator J, as shown in FIG. 8. The peak value of saw teeth $i$ is proportional to the respective pulse duration of signals $s$.

The output signal $i$ of integrator J is applied to two compensators C1 and C2. The comparison threshold of comparator C1 is formed by a voltage divider R1, R2 and is dimensioned so that the threshold is higher than the peal value of signal $i$ for a pulse duration corresponding to a logic 1. This threshold is exceeded by signal $i$ only due to the excessively long synchronization bit "syn". Thus, the output of comparator C1 delivers a signal $sy$, assuming the value 1, only at the end of a synchronization bit.

The comparison threshold of compartor C2 is formed by a voltage divider R3, R4 and is dimensioned so that this threshold is exceeded by the peak value of signal $i$ in cases where the pulse duration of signal $s$ corresponds to a logic 1 or to a synchronization bit Syn. Consequently, comparator C2 reproduces the serial word Ws.

The negative edges of signal s are differentiated by means of a differentiator D and converted into short positive timing pulses t. These pulses reproduce the data timing.

The operational signals thus obtained are further processes as follows: The data input D of a shift register SR is connected to the output of comparator C2. To input D, the serial data word Ws is applied. The data timing pulse series t is applied to input T of shift register SR. The number of cells of shift register SR corresponds to the word length, i.e., for each bit, including the synchronization bit of the data word, one cell of the shift register is provided. Now, as the serial word $w_s$ passes through shift register SR, the output of the register is dephased relative to the input by just one word length. This means that, with the inventive encoding of the arriving data words, at the instant the non-inverted word W has passed through the shift register, the input and output are non-equivalent, as far as no transmission disturbances have caused an invalidation. This non-equivalence is monitored by means of exclusive-OR gate EO, inverter I2, flip-flop F and divider Tn. Divider Tn may be, for example, a binary counter having a capacity of $2^4$ (corresponding to 2 × 8 bits). At the start of the non-inverted word W, this counter is zeroed by means of signal "sy" and counts forward by a step at each timing pulse t so that, at the end of passage of word W and at the start of word $\overline{W}$, the highest divider stage $2^4$ becomes logic 1. This signal is inverted by inverter I2 and forms an enabling signal for flip-flop F so that, only during the second half of the transmission (data word $\overline{W}$), flip-flop F becomes ready for storing an error, corresponding to an equivalence of W and $\overline{W}$.

While specific embodiments of the invention have been shown and described in detail to illustrate the application of the principles of the invention, it will be understood that the invention may be embodied otherwise without departing from such principles.

What is claimed is:

1. In an error detecting transmission system, for conveying information by means of pulse trains, of the type including an input transmitter, for the pulse train to be transmitted, incorporating a device for temporary storage and repetitive transmission of the pulse train to a transmission channel, and a receiver, receiving the pulse train from the transmission channel, incorporating a device for temporary storage of the first-received pulse train, and incorporating a comparator for comparing each received and temporarily stored pulse with the respective received associated pulse of the repeated pulse train, and incorporating a receiving register with an information output in which the information output is controlled as a function of the result of such comparison: the improvement comprising, in combination, a first shift register in said transmitter having a control input, a parallel word input and a serial word output; a second shift register in said receiver having a serial word input and serial word and parallel word outputs; said shift registers constituting said temporary storage devices; means supplying timing pulses to both shift registers to synchronize the same; said first shift register having an additional serial word input; an inverting element connecting the serial word output of said first shift register to said additional serial word input to produce a second, non-equivalent pulse train; the serial word output of said first shift register supplying pulse trains to said transmission channel, and the serial word input of said second shift register receiving pulse trains from said transmission channel; a comparator having a first input connected, in by-passing relation to said second shift register, to said transmission channel, and having a second input connected to the serial output of said second shift register; said receiving register connected to said parallel word output of said second shift register and operable to evaluate the transmitted data; and an error signal storage connected to the output of said comparator and to said receiving register; said comparator detecting transmission errors and transferring the same, as error signals, to said error signal storage; said error signal storage, upon receipt of an error signal, preventing evaluation of the transmitted data in said receiving register.

2. In an error detecting transmission system, the improvement claimed in claim 1, in which said comparator comprises an inverting exclusive OR gate having a pair of respective inputs, one connected to the serial word output of said second shift register and the other connected to said serial word input of said second shift register, and having an output connected to said error signal storage.

3. In an error detecting transmission system, the improvement claimed in claim 2, including an AND gate having a first input connected to the output of said inverting exclusive OR gate; a first flip-flop having an output connected to a second input of said AND gate; a divider receiving the transmitted pulse trains in parallel with said second shift register and connected in controlling relation with said first flip-flop; and a second flip-flop having an input connected to the output of said AND gate and an output connected to said receiving register; said second flip-flop constituting said error signal storage.

4. In an error detecting transmission system, the improvement claimed in claim 2, including pulse modulating means connected between the output of said transmitter and said transmission channel.

5. In an error detecting transmission system, the improvement claimed in claim 4, in which said pulse modulating means comprises an inverting exclusive OR gate having a pair of inputs connected to said transmitter and an output connected to said transmission channel, and effecting a pulse position modulation of the transmittal data.

6. In an error detecting transmission system, the improvement claimed in claim 5, including a flip-flop connected between said transmission channel and said receiver and converting the pulse position modulated signal into a clock-synchronized signal.

7. In an error detecting transmission system, the improvement claimed in claim 4, in which said pulse modulating means is a pulse duration modulation means and each data is preceded by a pulse of greatly increased relative length; and an internal threshold value circuit in said receiver evaluating said preceding pulse as a synchronization pulse.

8. In an error detecting transmission system, the improvement claimed in claim 7, in which, in addition to means modulating the pulse duration, means are provided modulating the pulse spaces.

9. In an error detecting transmission system, the improvement claimed in claim 1, in which said means supplying timing pulses comprises a clock pulse generator.

10. In an error detecting transmission system, the improvement claimed in claim 7, in which said means supplying timing pulses comprises a voltage controlled oscillator.

11. In an encoder and decoder for error-detecting transmission systems including a transmitter and a receiver, the improvement comprising, in combination, a dynamiciser included in said transmitter and operable to convert parallel input data into a non-inverted serial output data word; a transmission channel receiving the serial output word for transmission to said receiver; said dynamiciser repeating and inverting each data word for transmission to said receiver as an inverted data word immediately following each transmitted non-inverted serial output word; a shift register, included in said receiver, receiving the sequence of alternating inverted and non-inverted data words from said transmission channel, and delaying the sequence in a manner such that, at the input and output of said shift register, the two corresponding words, one non-inverted and the other inverted, are present at even timing instants; an exclusive OR gate having respective inputs connected to the input and output of said shift register; an error signal storage connected to the output of said exclusive OR gate and to said shift register; said exclusive OR gate detecting transmission errors and transferring the same, as error signals, to said error signal storage; a parallel output register connected to the output of said shift register; a gate connecting said error signal storage to said parallel output register and, responsive to detection of a transmission error, blocking transfer of the received data to said parallel output register.

12. In an encoder and decoder, the improvement claimed in claim 11 including pulse position modulating means modulating the serial data transmitted to said receiver.

13. In an encoder and decoder, the improvement claimed in claim 11, including means operable to transmit a special synchronizing word periodically to said receiver to effect synchronizing.

14. In an encoder and decoder, the improvement claimed in claim 11, including a decoder operable to decode the data before receipt thereof in said output register.

* * * * *